United States Patent
Li et al.

(10) Patent No.: US 10,367,617 B2
(45) Date of Patent: Jul. 30, 2019

(54) METHOD, BASE STATION AND USER EQUIPMENT FOR TRANSMISSION

(71) Applicant: Telefonaktiebolaget LM Ericsson (publ), Stockholm (SE)

(72) Inventors: Gen Li, Beijing (CN); Jinhua Liu, Beijing (CN); Rui Fan, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/552,365

(22) PCT Filed: Aug. 2, 2017

(86) PCT No.: PCT/CN2017/095627
§ 371 (c)(1),
(2) Date: Aug. 21, 2017

(87) PCT Pub. No.: WO2019/023985
PCT Pub. Date: Feb. 7, 2019

(65) Prior Publication Data
US 2019/0044676 A1   Feb. 7, 2019

(51) Int. Cl.
*H04W 74/00* (2009.01)
*H04L 5/00* (2006.01)
*H04W 48/16* (2009.01)
*H04W 74/08* (2009.01)

(52) U.S. Cl.
CPC ........... *H04L 5/0048* (2013.01); *H04W 48/16* (2013.01); *H04W 74/0808* (2013.01)

(58) Field of Classification Search
CPC .. H04L 5/0048; H04W 74/0808; H04W 48/16
See application file for complete search history.

(56) References Cited

U.S. PATENT DOCUMENTS

| | | |
|---|---|---|
| 2016/0073366 A1* | 3/2016 | Ng .................. H04W 56/001 370/329 |
| 2016/0119951 A1 | 4/2016 | Mallik et al. |
| 2018/0213386 A1* | 7/2018 | Kim ...................... H04J 11/00 |
| 2018/0241602 A1* | 8/2018 | Bhorkar ................ H04L 5/001 |
| 2018/0249484 A1* | 8/2018 | Kim ...................... H04W 74/08 |

FOREIGN PATENT DOCUMENTS

| | | |
|---|---|---|
| CN | 106688268 A | 5/2017 |
| WO | 2017 074101 A1 | 5/2017 |

OTHER PUBLICATIONS

3GPP TSG RAN WG1 Meeting #81; Fukuoka, Japan; Source: Samsung; Title: Discussion on LAA DRS design (R1-152866)—May 25-29, 2015.
PCT International Search Report for International application No. PCT/CN2017/095627—dated Apr. 23, 2018.

* cited by examiner

*Primary Examiner* — Phuc H Tran
(74) *Attorney, Agent, or Firm* — Baker Botts, LLP

(57) ABSTRACT

Method, base station and user equipment are disclosed for transmission. A method comprises performing listen-before-talk on at least one channel within a first window comprising two or more channels; selecting at least one available channel based on a result of the listen-before-talk; and transmitting a discovery reference signal on at least one resource block of the at least one available channel.

15 Claims, 12 Drawing Sheets

METHOD, BASE STATION AND USER EQUIPMENT FOR TRANSMISSION

PRIORITY

This nonprovisional application is a U.S. National Stage Filing under 35 U.S.C. § 371 of International Patent Application Serial No. PCT/CN2017/095627 filed Aug. 2, 2017, and entitled "Method, Base Station And User Equipment For Transmission."

TECHNICAL FIELD

Embodiments of the disclosure generally relate to wireless communication, and, more particularly, to method, base station and user equipment for transmission.

BACKGROUND

Mobile broadband will continue to drive the demands for big overall traffic capacity and huge achievable end-user data rates in a wireless network. Several scenarios may require data rates of up to 10 Gbps in a local area. These demands for very high system capacity and very high end-user date rates can be met by networks with distances between access nodes ranging from a few meters in indoor deployments up to roughly 50 m in outdoor deployments, i.e. with an infra-structure density considerably higher than the densest networks of today. Such networks may be referred as a new radio (NR) system. Besides traditional licensed exclusive bands, the NR system is also expected to be operating on unlicensed band.

Unlicensed band refers to radio frequency bands that are open for shared use by an unlimited number of compliant users. For various wireless communication systems operated in the shared unlicensed spectrum such as 2.4 GHz and 5 GHz, carrier sensing scheme is used when accessing a channel. That is, before accessing a channel or carrier by a wireless communication system, the wireless communication system shall firstly determine the channel is available via sensing the channel. If the channel is determined as unavailable, the wireless communication system shall not access the channel. Carrier sensing may also be interchangeably referred to as listen-before-talk (LBT) hereinafter. In addition, when the wireless communication system is required to receive a particular signal such as a discovery reference signal (DRS) or random access signal, it has to keep monitoring the particular signal on at least a channel.

However, there are some changes made in the NR system compared to existing networks/systems. This results in that some solutions in existing networks/systems might not suit the NR system very well. Therefore, it would be desirable to provide a solution for transmission in the NR system.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

According to one aspect of the disclosure, it is provided a method for transmission in a base station (BS). The method comprises: performing listen-before-talk on at least one channel within a first window comprising two or more channels; selecting at least one available channel based on a result of the listen-before-talk; and transmitting a discovery reference signal on at least one resource block of the at least one available channel in the first window.

In an embodiment, the first window comprises a first pattern of candidate resource block of the two or more channels, and performing listen-before-talk comprises performing the listen-before-talk based on the first pattern.

In an embodiment, the discovery reference signal is transmitted in at least two different directions and the first pattern comprises a cascading frequency hopping pattern.

In an embodiment, the first pattern or the cascading frequency hopping pattern is represented by at least one of time offset, time continuous number, repetition parameter, frequency offset, and resource position.

In an embodiment, at least one of the two or more channels has a first priority level, wherein performing listen-before-talk comprises performing the listen-before-talk based on the first priority level; and/or selecting at least one available channel comprises selecting at least one resource block based on the result of the listen-before-talk and the first priority level.

In an embodiment, the first priority level is determined based on at least one of a central channel of the first window being of a higher priority level; a channel used for last transmission of the discovery reference signal being of a higher priority level; and channel index.

In an embodiment, the method further comprise: detecting a physical random access signal based on a second window for physical random access signal detection, wherein the second window is determined based at least partly on the at least one resource block for transmission of the discovery reference signal.

In an embodiment, the second window comprises at least a channel for transmission of the discovery reference signal.

In an embodiment, the second window comprises only one resource block next to the at least one resource block for transmission of the discovery reference signal in time domain and on the channel for transmission of the discovery reference signal.

In an embodiment, the second window comprises a second pattern of candidate resource block, the method further comprises: detecting the physical random access signal based on the second pattern.

In an embodiment, the second window comprises at least two channels and at least one of the at least two channels has a second priority level, the method further comprises: detecting the physical random access signal based on the second priority level.

In an embodiment, the method further comprises detecting the physical random access signal in the first X time slots within the second window, wherein X is a positive integer greater than 1; and transmitting data for the rest time slots within the second window when the rest time slots are available.

In an embodiment, the channel is an unlicensed spectrum channel.

In an embodiment, the method further comprises: transmitting information regarding at least one of the first window, the second window, a neighbor cell's first window and a neighbor cell's second window.

According to another aspect of the disclosure, it is provided a method for transmission in a user equipment (UE). The method comprises: detecting a discovery reference signal; and determining a second window based at least partly on a resource block for reception of the discovery reference signal.

In an embodiment, detecting a discovery reference signal comprises: detecting the discovery reference signal based on a first window comprising two or more channels.

In an embodiment, the first window comprises a first pattern of candidate resource block of the two or more channels, and detecting a discovery reference signal comprises: detecting the discovery reference signal based on the first pattern.

In an embodiment, the first pattern of candidate resource block is represented by at least one of time offset, time continuous number, repetition parameter, frequency offset, and resource position.

In an embodiment, at least one of the two or more channels has a first priority level, and detecting the discovery reference signal comprises: detecting the discovery reference signal based on the first priority level.

In an embodiment, the first priority level is determined based on at least one of a central channel of the first window being of a higher priority level; a channel used for last reception of the discovery reference signal being of a higher priority level; and channel index.

In an embodiment, the second window comprises only one resource block next to a resource block for reception of the discovery reference signal in time domain and on the channel for reception of the discovery reference signal, and the method further comprises: transmitting a physical random access signal on the resource block.

In an embodiment, the method further comprises performing listen-before-talk on at least one channel within the second window; selecting an available channel based on a result of the listen-before-talk; and transmitting a physical random access signal on the available channel.

In an embodiment, the second window comprises a second pattern of candidate resource block, and performing listen-before-talk comprises: performing the listen-before-talk based on the second pattern.

In an embodiment, the second window comprises at least two channels and at least one of the at least two channel has a second priority level, wherein performing listen-before-talk comprises performing the listen-before-talk based on the second priority level; and/or selecting an available channel comprises selecting an available channel based on the result of the listen-before-talk and the second priority level.

In an embodiment, the channel is an unlicensed spectrum channel.

In an embodiment, the method further comprises receiving information regarding at least one of the first window, the second window, a neighbor cell's first window and a neighbor cell's second window.

According to another aspect of the disclosure, it is provided a base station (BS) capable of transmission. The BS comprises a processor and a memory. The memory contains instructions executable by the processor, whereby the BS is operative to: perform listen-before-talk on at least one channel within a first window comprising two or more channels; select at least one available channel based on a result of the listen-before-talk; and transmit a discovery reference signal on at least one resource block of the at least one available channel.

According to another aspect of the disclosure, it is provided a user equipment (UE) capable of transmission. The UE comprises a processor and a memory. The memory contains instructions executable by the processor, whereby the UE is operative to detect a discovery reference signal; and determine a second window based at least partly on a resource block for reception of the discovery reference signal.

According to another aspect of the disclosure, it is provided a computer program product. The computer program product comprises instructions which when executed by at least one processor, cause the at least one processor to perform the method according to the above aspect.

According to another aspect of the disclosure, it is provided a computer readable storage medium. The computer readable storage medium comprises instructions which when executed by at least one processor, cause the at least one processor to perform the method according to the above aspect.

According to another aspect of the disclosure, it is provided a base station (BS) capable of transmission. The BS comprises: means for performing listen-before-talk on at least one channel within a first window comprising two or more channels; means for selecting at least one available channel based on a result of the listen-before-talk; and means for transmitting a discovery reference signal on at least one resource block of the at least one available channel.

According to another aspect of the disclosure, it is provided a user equipment (UE) capable of transmission. The UE comprises means for detecting a discovery reference signal; and means for determining a second window based at least partly on a resource block for reception of the discovery reference signal.

These and other objects, features and advantages of the disclosure will become apparent from the following detailed description of illustrative embodiments thereof, which are to be read in connection with the accompanying drawings.

DETAILED DESCRIPTION

Figure 1:
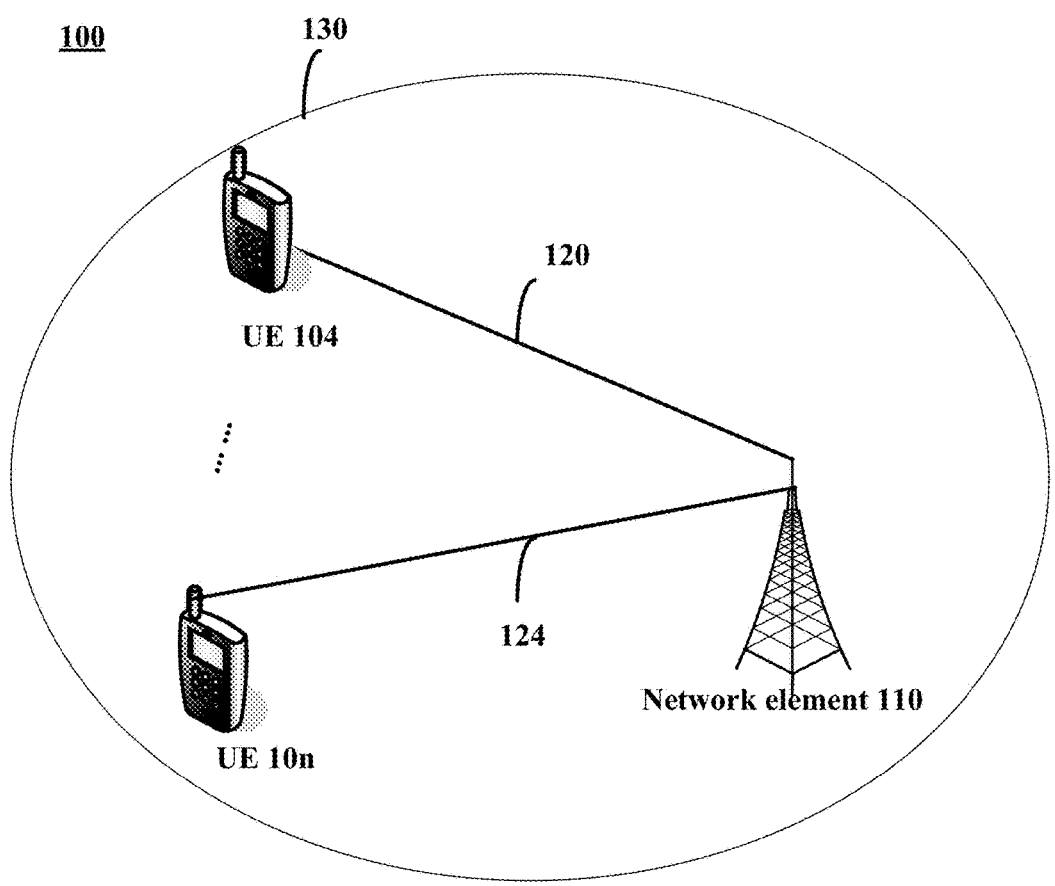
FIG. 1 a diagram depicting a schematic system, in which some embodiments of the present disclosure can be implemented.

For the purpose of explanation, details are set forth in the following description in order to provide a thorough understanding of the embodiments disclosed. It is apparent, however, to those skilled in the art that the embodiments may be implemented without these specific details or with an equivalent arrangement.

It is agreed recently in 3GPP (3rd Generation Partnership Project) that the maximum supporting channel bandwidth for the NR system below 6 GHz should be at least 100 MHz. This means the NR system could operate on a larger bandwidth than 20 MHz channel as in LAA (Licensed Assisted Access).

Wi-Fi (such as 802.11n, 802.11ac, etc.) defines a new wider channel other than 20 MHz. Wi-Fi adopts a hierarchical channel bonding scheme by combining contiguous 20 MHz sub-channels in a non-overlapping manner. One of these sub-channels is designated as a primary channel while the others are designated as secondary channels. Counting down of the random backoff counter is based on the outcome of clear channel assessments on the primary channel. On the secondary channels, only a quick CCA (Clear Channel Assessment) check is performed for Point Coordination Function Interframe Space (PIFS) duration (generally 25 μs) before the potential start of transmission, to determine which of the secondary channels are also available in addition to the primary channel. The signal and energy detection thresholds for secondary channels are generally higher than those for the primary channel, and scale up with increasing channel bandwidth. Upon expiration of the backoff counter, the overall transmission bandwidth is determined by the results of the secondary CCA checks.

The Wi-Fi AP (access point) (e.g. 802.11n or 802.11ac) operating on multiple channels (e.g. 40 MHz, 80 MHz or 160 MHz) should still be capable of allowing legacy clients (e.g. 802.11a) to associate. Thus, beacons are sent on one 20-MHz channel, known as the primary channel, within the multiple channels. The AP and all clients associated with the AP receive and process every transmission that overlaps this primary channel and extract virtual carrier sense from the frames they can decode.

For LAA, one licensed carrier could aggregate at least one secondary unlicensed carrier. Two main alternatives for LAA multicarrier LBT are used.

(1): Single random backoff channel. Similar with Wi-Fi, only one full-fledged random backoff needs to be completed on any one carrier along with quick CCA checks on the other channels, before transmission occurs. The eNB (eNodeB) shall choose the carrier requiring Cat-4 based LBT uniformly and randomly before each transmission burst or fix the carrier at least for 1 second. The energy detection threshold used on channels not performing Cat-4 based LBT is same as the one used on channel performing LBT. A single backoff counter should be used for the carrier on which LBT is performed. eNB can use the Option 1 or Option 2:

Option 1: a CW (contention window) size is updated based on HARQ (hybrid automatic repeat request) feedback for all the carriers.

Option 2: the CW size is updated independently per carrier. The largest CW size among the carriers is used to draw the backoff counter.

(2): Parallel random backoff channels. Multiple SCells (secondary cells) should each have individually completed full-fledged random backoffs before transmitting simultaneously. This is equivalent to individually performing the single-carrier LBT procedure on each SCell. The eNB can transmit DL (downlink) data burst(s) on the carriers that has completed Cat-4 based LBT with potential self-deferral (including idle sensing for a single interval) to align transmission over multiple carriers. eNB can perform CW window update independently for Cat-4 based LBT on more than one unlicensed carriers, eNB can use independent backoff counters or can use a common backoff counter for multiple carriers. When a common backoff counter is used, the common random number shall be drawn based on the largest CW size of the carriers which were used in prior transmission. Since multiple secondary unlicensed carriers are independent, DRS will be transmitted respectively in each secondary channel according to LAA rules. Particularly, each secondary carrier will have its DMTC (discovery measurement timing configuration) window. eNB needs to perform LBT for each carrier and send DRS respectively when LBT succeeds.

As mentioned above, NR-U (NR-unlicensed) could be operating in a wide bandwidth such as 100 MHz, which means NR unlicensed operation could operate across multiple 20 MHz channels. In this wider bandwidth than 20 MHz (e.g. 40 MHz, 80 MHz etc.), DRS transmission could follow similar methods with Wi-Fi or LAA. However, the following problems exists:

Primary channel DRS as NR-U could select one 20 MHz channel in the whole operating wide bandwidth as primary channel. Then DRS is only sent on this primary channel. The problem here is that the primary channel may be very crowded in certain time duration (e.g. 1 s) and thus DRS transmission in this primary channel cannot be guaranteed. In this case, the whole wider carrier may not be operating well without transmitting DRS.

Independent channel DRS as LAA: NR-U attempts to transmit DRS in each 20 MHz channel in the whole wide carrier during one DMTC time window. The problem here is waste of resource by transmitting multiple duplicated DRS in the wide bandwidth. Actually there is no need to have multiple DRS transmission at the same time in one wider carrier. Another problem is that it needs multiple channel chains to perform LBT and transmission in different channels, which result in more costs.

In addition, for standalone unlicensed operation, the random access (RA) needs to be performed in the unlicensed carrier as well. A window for PRACH (physical random access channel) is configured for a UE (user equipment), and the UE shall sense the configured PRACH resources when PRACH transmission is necessary and send PRACH in the PRACH resource if the PRACH resource is determined to be available.

For unlicensed cell of LAA-LTE (Long Term Evolution), no PRACH procedure is specified, the UE is supposed to achieve synchronization with an aggregated unlicensed SCell by monitoring its licensed. PCell (primary cell). For MuLTEFire, which is standalone unlicensed operation, a 4-step RA procedure could be used. Message 1, 2, 3 and 4 are transmitted with LBT procedure. If the channel is occupied throughout the PRACH window, the UE shall wait for the next PRACH window.

In LTE, the PRACH resource is configured to be located in the same channel for DRS transmission, and the UE shall wait until the channel available for PRACH transmission if the channel is occupied by another neighboring transmitter node. If the similar procedure is reused for standalone unlicensed operation in NR, a large PRACH window shall be configured and the gNB of NR shall be in PRACH monitoring state within the PRACH window. The procedure results in not only random access delay for the UE, but also resource waste and the power waste for the gNB due to that the gNB has to keep monitoring PRACH for a long time and it is not allowed for the gNB to transmit data in DL.

The present disclosure proposes a solution for transmission in the NR system. It may overcome at least one of the drawbacks mentioned above, or it may not overcome any one of the drawbacks mentioned above. It is noted that though the embodiments are mainly described in the context of the NR system, they are not limited to this but can be applied to any suitable wireless system. Moreover, the embodiments can be applied to transmission of any suitable signal such as control signal or data signal, though they are mainly discussed in the context of transmission of DRS and random access signal. In addition, it is noted that the embodiments can be applied to licensed channel operation, though they are mainly discussed in the context of unlicensed operation.

FIG. 1 depicts a schematic system, in which some embodiments of the present disclosure can be implemented. While this and other embodiments below are primarily discussed in the context of a 5G NR system, it will be recognized by those of ordinary skill that the disclosure is not so limited. In fact, the various aspects of this disclosure are useful in any wireless network/system that can benefit from the embodiments as is described herein, such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), etc. UTRA includes Wideband CDMA (WCDMA) and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc.

As shown in FIG. 1, the wireless system 100 comprises a network element 110 such as a cellular base station, for example a gNB in NR. The network element 110 may refer to a function element on the network side as compared to a UE. For example, the network element 110 may comprise an eNB, a Home eNode B, a femto Base Station, a pica BS, gNB or any other node capable to serve UEs 104-10n in the system 100. It is well known that a cellular radio system may comprise a network of radio cells each served by a transmitting station, known as a cell site or base transceiver station. The radio network provides wireless communications service for a plurality of transceivers (in most cases mobile). The network of network elements working in collaboration allows for wireless service which is greater than the radio coverage provided by a single network element. The individual network element may be connected by another network (in many cases a wired network, not shown), which includes additional controllers for resource management and in some cases access to other network systems (such as the Internet) or metropolitan area networks (MANs). The ellipse 130 schematically indicates a coverage range of the network element 110.

As shown in FIG. 1, the system 100 may comprise one or more UEs 104-10n, each of which may operably communicate with the network element 110 such as a cellular base station through a wireless link, such as link 120 and 124. The UEs 104-10n can be fixed or moveable. UEs 104-10n may include, but not limited to, cellular telephones, smart phones, and computers, whether desktop, laptop, or otherwise, as well as mobile devices or terminals such as cellular network UEs, machine type communication devices, hand-held computers, personal digital assistants (PDAs), wireless sensors, wearable devices, video cameras, set-top boxes, personal media devices, or any combinations of the foregoing, which may be provided with wireless communication functionality and run with any kind of operating system including, but not limited to, Windows, Linux, UNIX, Android, iOS and their variants.

Further, the term "wireless" means any wireless signal, data, communication, or other interface including without limitation 5G (e.g., NR), 4G (e.g., LTE, LTE-A), Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM.

In addition, though only one network element 110 is shown in FIG. 1, there may be two or more network elements such that some UEs are within the coverage range of first network element, some UEs are within the coverage range of second network element, and some UEs are at the border of the coverage ranges of two or more network elements, and so on. In the latter case, UEs may receive signals from each of the two or more network elements.

Figure 2:
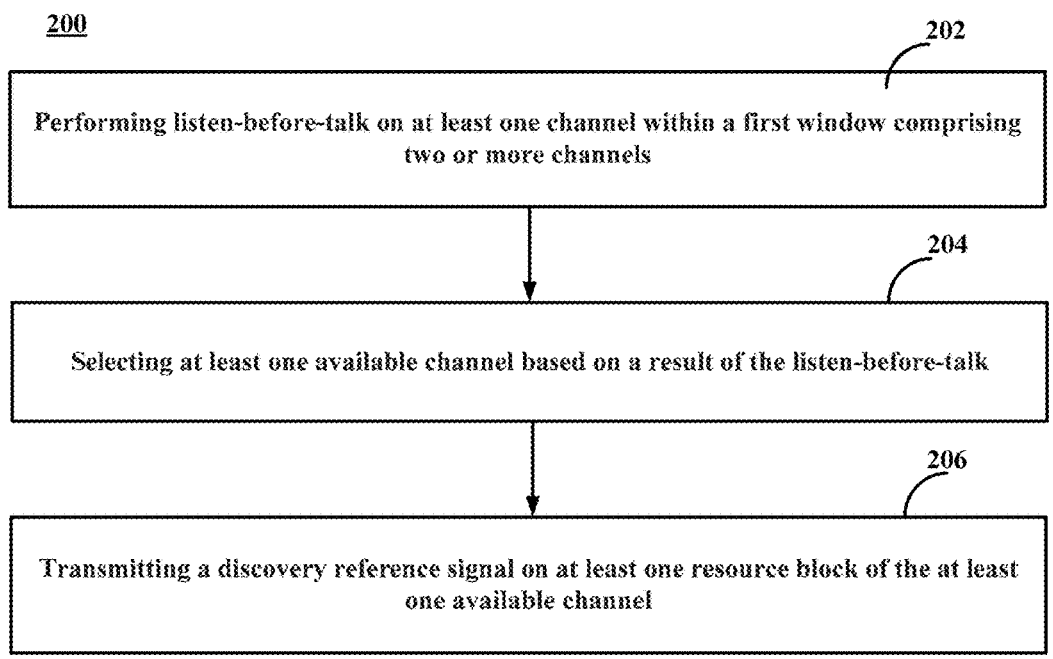
FIG. 2 is a flow chart depicting a method of transmission according to an embodiment of the present disclosure.

FIG. 2 is a flow chart depicting a method 200 of transmission according to an embodiment of the present disclosure, which may be performed at an apparatus such as the network element 110 of FIG. 1. As such, the network element 110 may provide means for accomplishing various parts of the method 200 as well as means for accomplishing other processes in conjunction with other components.

As shown in FIG. 2, the method 200 may start at block 202 where the network element 110 may perform LBT on at least one channel within a first window comprising two or more channels. The first window may be configured or determined by the network element 110 or any other suitable network element. In case of determination or configuration by another network element, another network element may transmit information about the first window to the network element 110. In addition, different network elements may have same or different first window.

Figure 3:
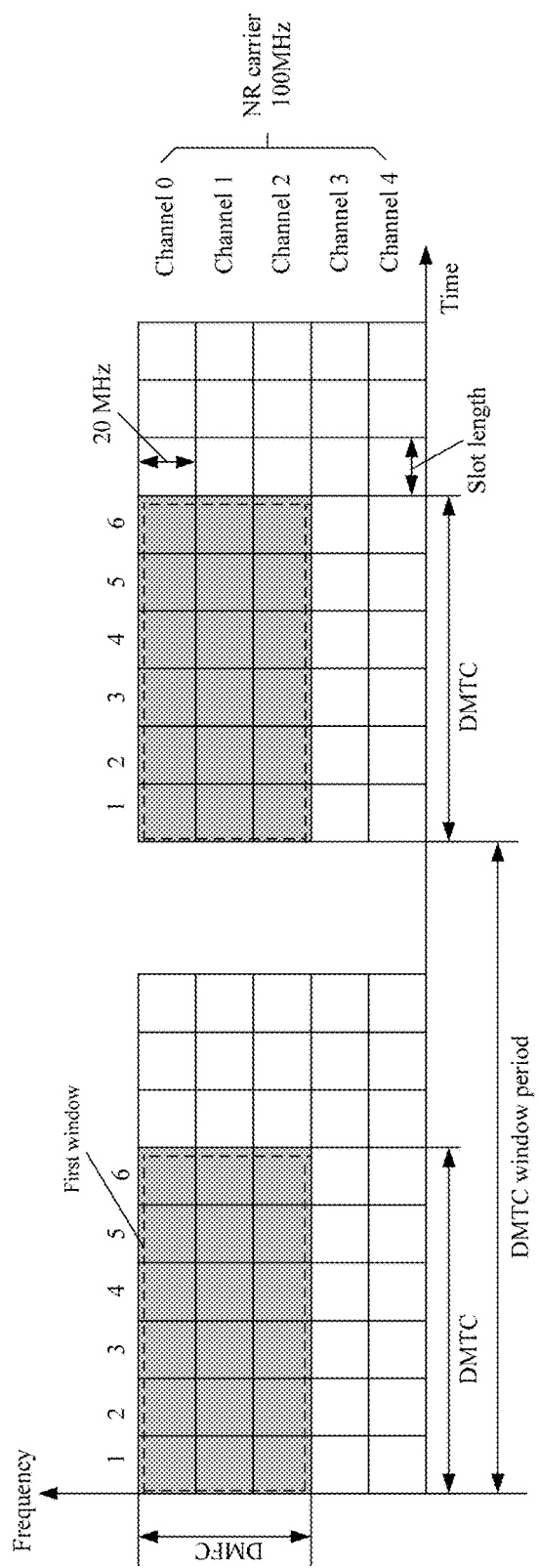
FIG. 3 is a diagram depicting a first window according to an embodiment of the present disclosure.

FIG. 3 is a diagram depicting a first window according to an embodiment of the present disclosure. As shown in FIG. 3, a NR carrier may include 5 channels each of which has a 20 MHz bandwidth and the first window may be defined by DMFC (discovery measurement frequency configuration) size. The size of DMFC represent the number of channels comprised by the first window. In the embodiment depicted in FIG. 3, the first window is a closed window thus is also defined by DMTC (discovery measurement timing configuration) in time domain. The sizes of DMFC and DMTC may be predetermined. For example, the size of DMFC is 3 and channels 0, 1 and 2 are candidate channels, and the size of DMTC is 6. It is noted that the sizes of DMFC and DMTC are only exemplary and may be different in other embodiments. In addition, the NR carrier may have any other suitable bandwidth. In FIG. 3, each resource block of channels 0, 1 and 2 are candidate resource blocks for transmission of DRS. The first window may be represented by any suitable parameters such as channel indexes and time slot indexes. For example, the first window as shown in FIG. 3 may be represented by channel indexes 1-3 and time slot indexes 1-6.

It is noted that the first window may not be needed to be continuous as shown in FIG. 3. For example, the first window may comprise channel 0, 2 and 4. In addition, the network element 110 can perform LBT for channels 0, 1 and 2 simultaneously or sequentially before and during DMTC in the first window as shown in FIG. 3 at block 202. For example, if the network element 110 has a plurality of receiving (RX) and transmitting (TX) chains available for LBT, then the network element 110 may perform LBT simultaneously. If the network element 110 has only one receiving (RX) and transmitting (TX) chain available for LBT, then the network element 110 may perform LBT sequentially.

In another embodiment, DRS can be transmitted in one or more of the selected resource blocks in the first window. In other words, a part of resource blocks in the first window can be used as candidate resource blocks for DRS transmission. In this case, the first window may comprise a first pattern of candidate resource block of the two or more channels. The first pattern of candidate resource block can have any suitable pattern, and the disclosure has no limit on it. For example, each channel in the first window may have at least one candidate resource block for DRS transmission. Each channel in the first window may have the same number of candidate resource blocks for DRS transmission. A channel in the first window may not have a candidate resource block for DRS transmission. A channel may have a larger number of candidate resource blocks for DRS transmission than another channel.

Figure 4:
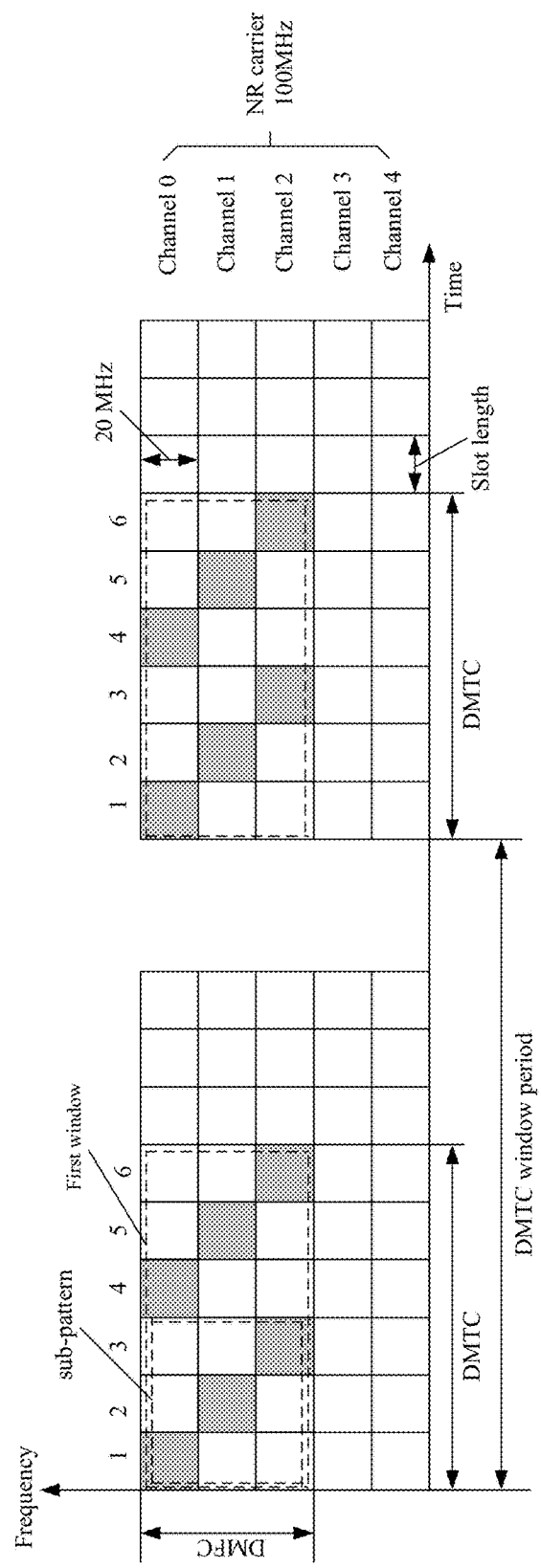
FIG. 4 is a diagram depicting a first window comprising a first pattern of candidate resource block according to an embodiment of the present disclosure.

FIG. 4 is a diagram depicting a first window comprising a first pattern of candidate resource block according to an embodiment of the present disclosure. FIG. 4 is similar to FIG. 3 except that first window comprises a first pattern of candidate resource block in which the candidate resource blocks are just a part of all resource blocks comprised by the first window. One can understand that a first pattern could also comprise all resource blocks in the first window as candidate resource blocks as shown in FIG. 3. As shown in FIG. 4, the resource blocks in gray are candidate resource blocks for transmission of DRS.

In this embodiment, the network element 110 can perform LBT based on the first pattern. For example, the network element 110 performs LBT for channel 0 before time slot 1 since only one candidate resource block at time slot 1 among channels 0~2. If this resource block is not available according to the result of LBT, the network element 110 can perform LBT at slot 1 (before slot 2) for candidate resource block positioned at slot 2, channel 1. The LBT will be performed based on the first pattern until at least an available resource block is found.

The first pattern of candidate resource block may be represented by any suitable parameters. In an embodiment, the first pattern of candidate resource block may be represented by at least one of time offset, time continuous number, repetition parameter, frequency offset, and resource position. Time offset may be defined as an offset between starting slot in adjacent channels, e.g. it is 1 for the first pattern in FIG. 4. Time continuous number may be defined as the number of continuous slots in a channel, e.g. it is 1 for the first pattern in FIG. 4. Repetition parameter may be defined as the repetition times for a sub-pattern, e.g. it is 2 for the first pattern in FIG. 4. If not all channels in the DMFC are allowed to transmit DRS, a frequency offset could also be introduced. For example, if only channels 0 and 2 in a NR carrier are allowed to transmit DRS and then the frequency offset is set to 2. The resource position may be defined by time slot index and the channel index.

In another embodiment, when the network element 110 may transmit DRS in at least two different directions such as beamforming directions, and the first pattern comprises a cascading frequency hopping pattern which is employed to maintain continual transmission when LBT is successful.

Figure 5:
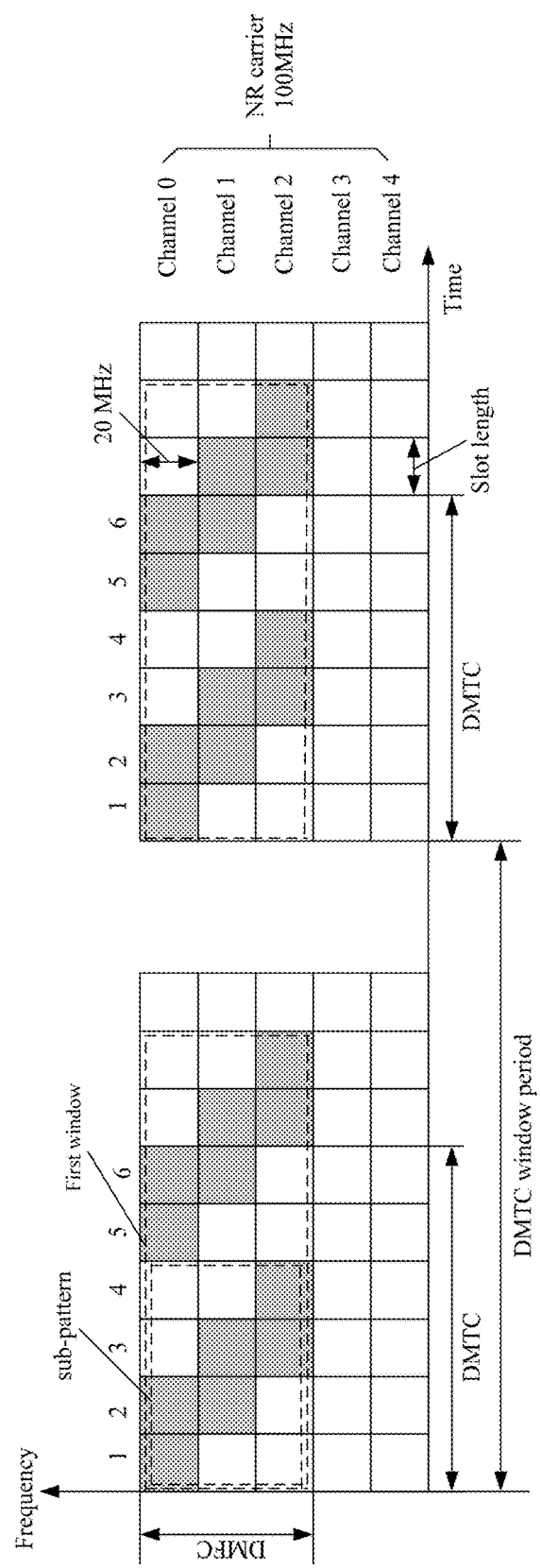
FIG. 5 is a diagram depicting a first window comprising cascading frequency hopping pattern according to an embodiment of the present disclosure.

FIG. 5 is a diagram depicting a first window comprising cascading; frequency hopping pattern according to an embodiment of the present disclosure. FIG. 5 is similar to FIG. 4 except that the number of continuous slots in a channel is 2 for the cascading frequency hopping pattern. As shown in FIG. 5, the resource blocks in gray are candidate resource blocks for transmission of DRS. For example, the network element 110 performs LBT for channel 0 before time slot 1 since there is only one candidate resource block at time slot 1 among channels 0~2. If this resource block positioned at slot 1, channel 0 is available according to the result of LBT, the network element 110 can select the resource blocks positioned at slot 1, channel 0 and slot 2, channel 0. For example, the network element 110 can transmit DRS on the resource block positioned at slot 1, channel 0 in a beamforming direction and transmit DRS on the resource block positioned at slot 2, channel 0 in another beamforming direction. In this case, the network element 110 does not need to perform LBT on the resource block positioned at slot 2, channel 0. In this way, the network element 110 performs LBT on the first one of continuous candidate resource blocks, thereby saving resources for LBT. If this resource block is not available according to the result of LBT, the network element 110 can perform LBT at slot 1 (before slot 2) for candidate resource block positioned at slot 2, channel 1. The LBT will be performed based on the cascading frequency hopping pattern until at least an available resource block is found.

In an embodiment, channel priority level is introduced. At least one of the two or more channels within the first windows may have a first priority level. The first priority level may be determined based on any suitable criteria. For example, the criteria may comprise channel usage rate, channel index, channel position, channel usage history information, etc. In a further embodiment, a channel with higher first priority level may have a larger number of candidate resource blocks for DRS transmission.

In an embodiment, the channel priority order may comprise at least one of: a central channel of the first window being of a higher priority level, a channel used for last transmission of DRS being of a higher priority level, and channel index. Once a first window is determined, priority level of the channels within the first window can be determined. Taking channels 0~2 as the first window for example, channel 1 may have a higher priority level based on a central channel of the first window being of a higher priority level in FIGS. 3-5. If channel 0 is used for last transmission of DRS, channel 0 may have a higher priority level based on a channel used for last transmission of the discovery reference signal being of a higher priority level in FIGS. 3-5. In addition, the first priority level may be determined based on a descending/ascending order of channel index. For example, in case of descending order, channel 2 may have a higher priority level and channel 0 may have a lower priority level.

In this embodiment, the network element 110 may perform LBT based on the determined priority level of the channels. As an example, supposing that there are three channels for LBT in the first window and the first priority level of channel 1 is higher than that of channel 0 which is higher than that of channel 2 and only one receiving (RX) and transmitting (TX) chain is available for LBT, the network element 110 may first switch RX chain to channel 0 to perform LBT for channel 0. Then the network element 110 may switch RX chain to channel 1 immediately after LBT failed on channel 0. This procedure may be repeated until LET is successful.

Turn to FIG. 2, at block 204, the network element 110 may select at least one available channel based on a result of LBT. For example, the first available channel may be selected for DRS transmission. If there are two or more available channels, i.e. two or more available resource candidates at a same slot, the network element 110 may select an available channel randomly or based on any other suitable rules such as priority level. As anther example, the network element 110 may select two or more available channels for DRS transmission based on a same priority level of the two or more available channels, or without considering the channel priority level.

In an embodiment, at least one of the two or more channels has a first priority level as described above, the network element 110 may select at least one resource block based on the first priority level. For example, if there are two or more available channels for DRS transmission, then the network element 110 may select the at least one resource block of the available channel with highest first priority level for DRS transmission.

At block 206, the network element 110 may transmit DRS on at least one resource block of the at least one available channel.

The above embodiments have the following advantages compared to existing solutions:

Compared to primary channel solution, the above embodiments could have more candidate channels to transmit DRS so that the possibility of transmitting DRS in time is enhanced a lot by this diversity from multiple channels Compared to all channel DRS transmission, the above embodiments avoid the redundant unnecessary DRS transmission overhead while guaranteeing DRS transmission possibility.

Figure 6A:
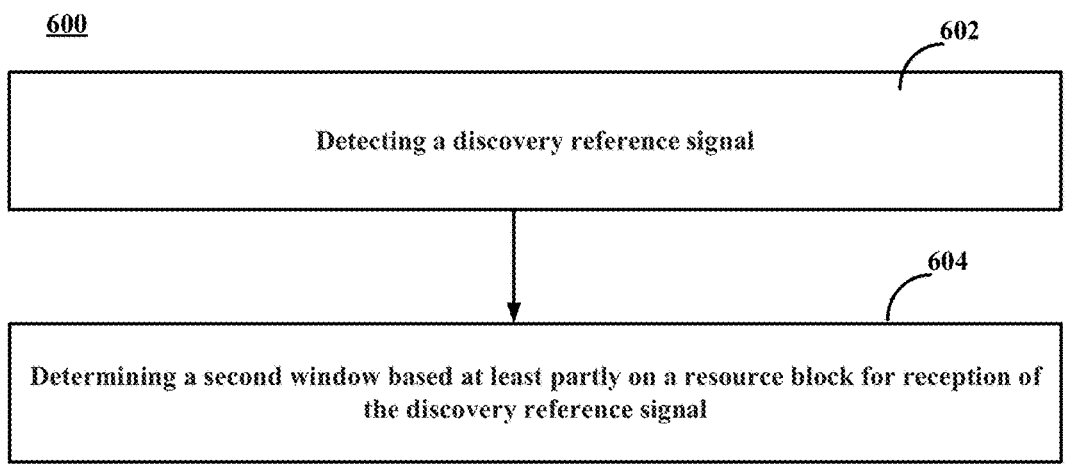
FIG. 6A is a flow chart depicting a method of transmission according to an embodiment of the present disclosure.
Figure 6B:
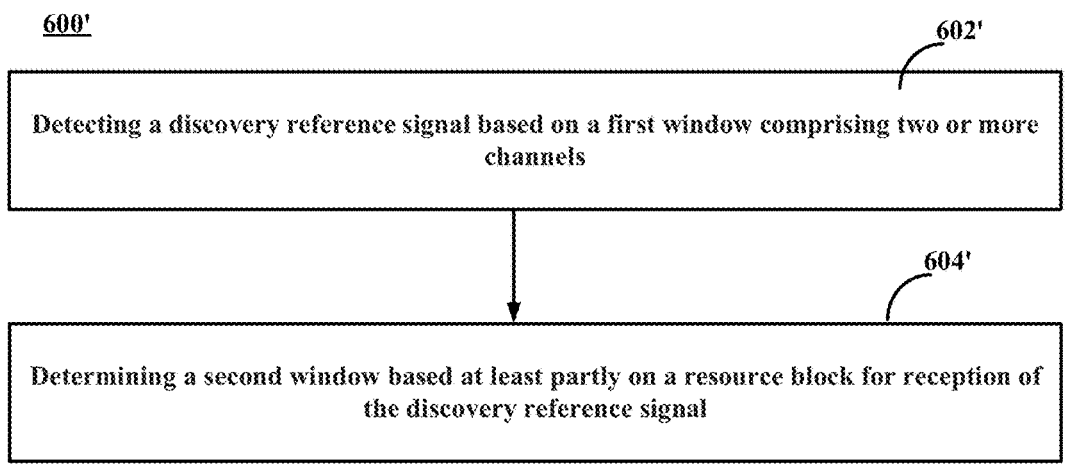
FIG. 6B is a flow chart depicting a method of transmission according to an embodiment of the present disclosure.

FIG. 6A-B are flow charts depicting methods 600, 600' of transmission according to embodiments of the present disclosure, which may be performed at an apparatus such as UE 104-10*n* of FIG. 1. As such, UE 104-10*n* may provide means for accomplishing various parts of the methods 600, 600' as well as means for accomplishing other processes in conjunction with other components.

As shown in FIG. 6A, the method 600 may start at block 602 where UE 104 detects DRS. UE may detect a DRS in its legacy procedure, depending on how the network node such as a gNB determine and send a DRS. Or UE detects a DRS based on a first window comprising two or more channels as shown at block 602' in FIG. 6B.

The first window may be configured or determined by the network element 110 or any other suitable network element. In addition, different network elements 110 may have same or different first window. The information about the first window may be transmitted to UE 104-10*n* by any suitable network element. For example, when UE 104 is within an area served by the network element 110, the network element 110 may transmit the information about its first window to UE 104 for example through a licensed or unlicensed carrier. Since the first window has been described above with reference to FIG. 3, detailed description about it is omitted here for brevity. In another circumstance, a network element 110 may transmit the information about its neighbor's first window to UE 104, such that the UE can detect a DRS from its neighbor cell and generate a measurement report on the neighbor cell.

UE 104 may detect DRS on channels within the first window simultaneously or sequentially at block 602'. For example, if UE 104 has a plurality of receiving (RX) and transmitting (TX) chains available for detection, then LTE 104 may perform detection simultaneously. If UE 104 has only one receiving (RX) and transmitting (TX) chain available for detection, then UE 104 may perform LBT sequentially.

In an embodiment, the first window may comprise a first pattern of candidate resource block of the two or more channels. The first pattern has been described above with reference to FIG. 4, therefore detailed description about it is omitted here for brevity.

The first pattern of candidate resource block may be represented by any suitable parameters. In an embodiment, the first pattern of candidate resource block may be represented by at least one of time offset, time continuous number, repetition parameter, frequency offset, and resource position as described in the above embodiments.

In this embodiment, UE 104 may detect DRS based on the first pattern. For example, supposing the first pattern of FIG. 3, UE 104 may detect DRS on channel 0 at time slot 1 since there is only one resource block at time slot 1 among channels 0~2. If DRS cannot be detected on this resource block, then the UE 104 can detect DRS on channel 1 at slot 2. The detection will be performed based on the first pattern until DRS is detected. In an embodiment, channel priority level is introduced. At least one of the two or more channels within the first windows may have a first priority level. The first priority level may be determined based on any suitable criteria. For example, the criteria may comprise channel usage rate, channel index, channel position, channel usage history information, etc. The first priority level has been described above with reference to FIGS. 3-5, therefore detailed description about it is omitted here for brevity.

The channel priority order may comprise at least one of a central channel of the first window being of a higher priority level, a channel used for last transmission of the discovery reference signal being of a higher priority level and channel index as described above with reference to FIGS. 3-5.

In this embodiment, UE 104 may detect DRS based on the determined first priority level of the channels. As an example, supposing that there are three channels for LBT in the first windows and the first priority level of channel 1 is higher than that of channel 0 which is higher than that of channel 2 and only one receiving (RX) and transmitting (TX) chain is available for detection, UE 104 may first switch RX chain to channel 0 to detect DRS on channel 0. Then UE 104 may switch RX chain to channel 1 immediately after detection failed on channel 0. This procedure is repeated until DRS is detected.

As an example, If LTE 104 can operate in the whole carrier or larger than DMFC bandwidth, it may filter the signal in the resource box covering DMTC and DMFC (e.g. dashed box of first window in FIGS. 3-4). Then it performs L1 processing on the candidate resources (e.g. make correlation) to detect DRS transmission. Besides, if the priority level of candidate channels for DRS transmission is configured, UE may try a channel with a higher priority level first. If UE 104 could only operate on one channel such as 20 MHz or less than DMFC bandwidth, it may filter the signal slot by slot in DMFC for example according to the channel index in that slot. For example, if the first pattern in FIG. 4 is configured, UE 104 may switch its RX chain to channel 0 in slot 0 to see if DRS exists. If DRS is not detected in slot 0, UE 104 may switch to channel 1 immediately and get ready for detecting DRS in slot 1. This will be repeated until DRS is detected in the first window covered by DMTC and DFTC.

After UE 104 has detected DRS, it may transmit a physical random access signal to the network element 110 to access the network. UE 104 may determine a second window for physical random access signal transmission based at least partly on a resource block for reception of DRS at block 604, 604' in FIGS. 6A-6B. UE 104 may determine the second window based at least partly on the resource block for reception of DRS in any suitable ways. For example, the suitable ways may be known by both the network element 110 and UE 104. In addition, information regarding the second window, such as configuration parameters for the second window, may be included in DRS or system information broadcast, then UE 104 may obtain the configuration parameters from the received DRS or system information broadcast and then determine the second window based on the resource block for reception of DRS and the configuration parameters.

Figure 7:
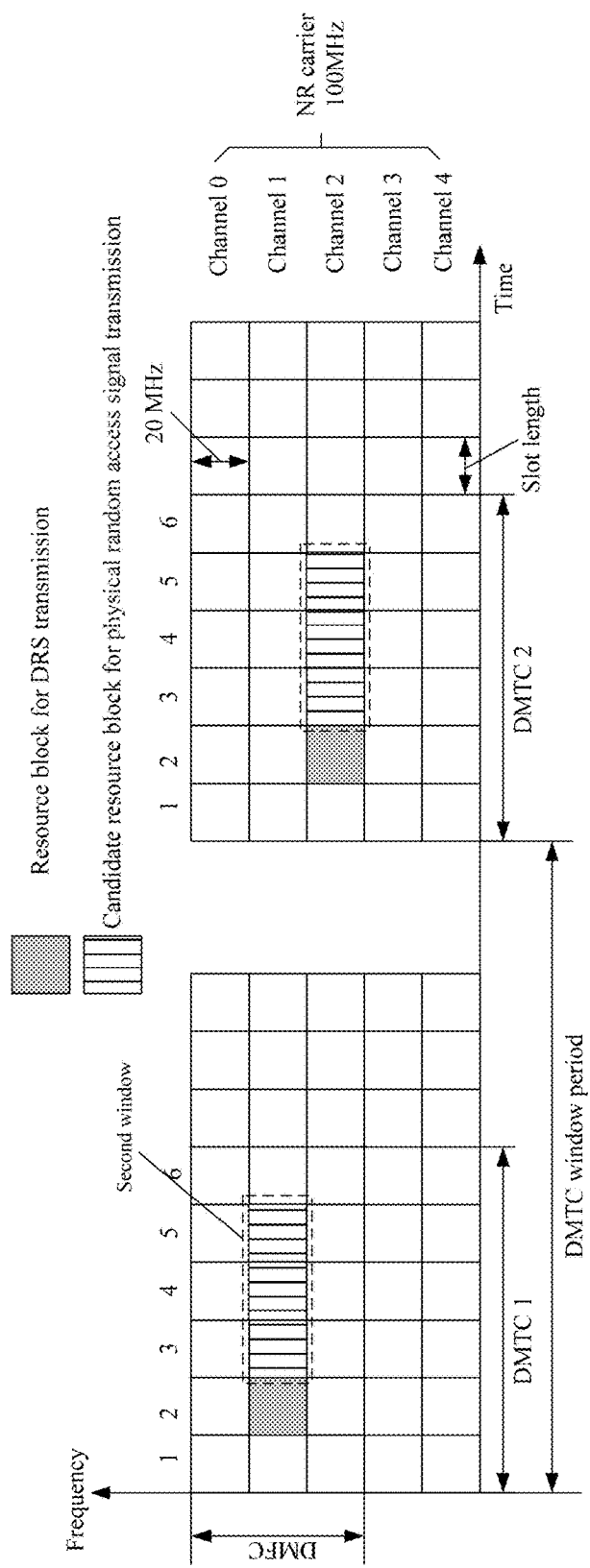
FIG. 7 is a diagram depicting a second window according to an embodiment of the present disclosure.
Figure 8:
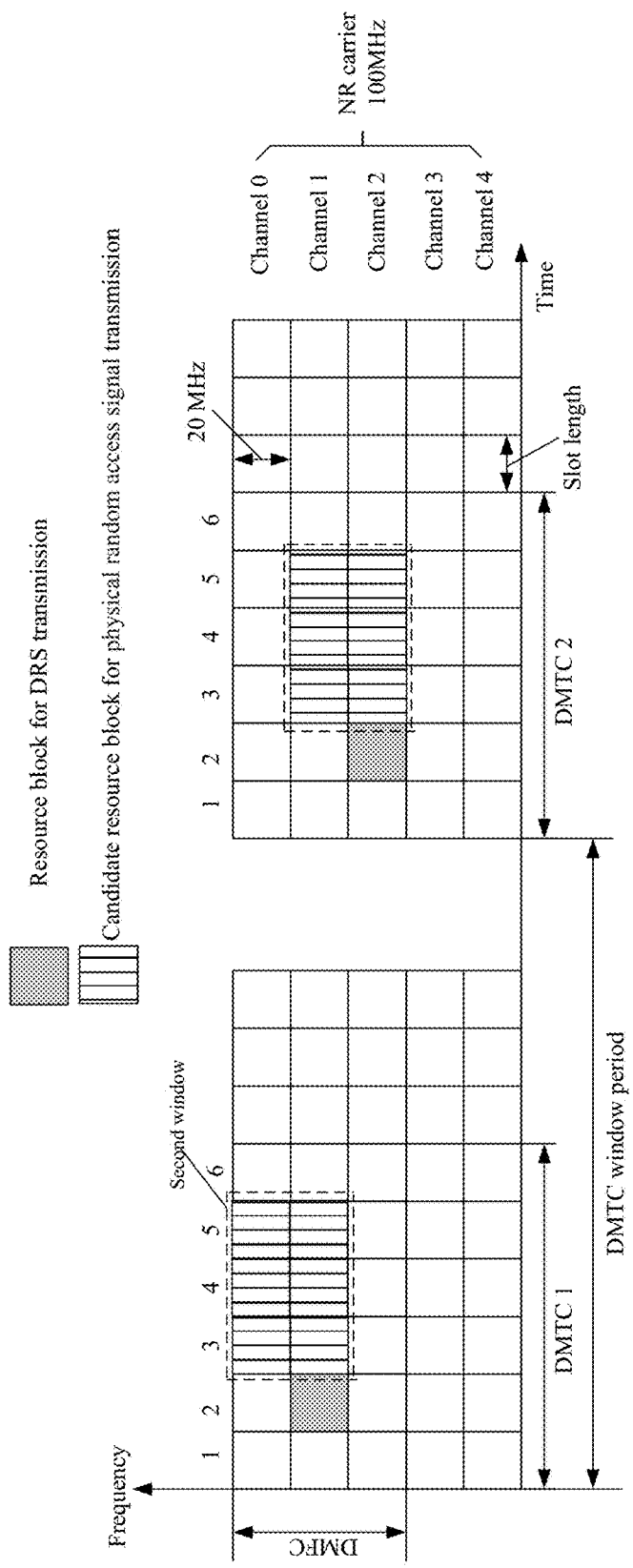
FIG. 8 is a diagram depicting a second window according to an embodiment of the present disclosure.

FIGS. 7-8 are diagrams depicting a second window according to embodiments of the present disclosure. FIG. 7 shows the second window comprising a same channel as DRS transmission while FIG. 8 shows the second window comprising more than one channel, wherein resource blocks in gray are used for DRS transmission by the network element 110, i.e., UE 104 has detected DRS on this resource block, and resource blocks filled with vertical lines are candidate resource blocks for physical random access signal transmission. For instance, start time of the second window may be determined with respect to the ending time of DRS transmission. In this embodiment, the candidate resource blocks for physical random access signal transmission are conditionally determined based on DRS transmission, and the channel switch of DRS may result in the channel switch of physical random access signal transmission. The sizes of the second window as shown in FIGS. 7-8 are only for the purpose of illustration and may be different in other embodiments. It is noted that the channels in the second window may not be continuous as shown in FIG. 8. For example, the second window may comprise channels 1 and 3.

The second window may be represented by any suitable parameters. For example, the second window as shown in FIG. 7 may be represented by the same channel for DRS transmission, start time of the second window equal to ending time of DRS transmission, time continuous number being 3. Similar to the first window, the second windows may be represented by at least one of time offset, time continuous number, repetition parameter, frequency offset, and resource position.

In an embodiment, as shown in FIG. 7 or FIG. 8, the second window may comprise the same channel for reception of DRS, and UE 104 may perform short LBT for physical random access signal transmission on this channel.

In an embodiment, the second window may comprise only one resource block next to a resource block for reception of the discovery reference signal in time domain and on the same channel for reception of DRS. UE 104 may transmit a physical random access signal on the resource block within the second window. In this way, UE 104 may not necessary to perform LBT for physical random access signal transmission since according to the current rule, no LBT is needed for a continuous 16 us after a successful LBT. However, under circumstance that too many UEs are going to send preamble in a same RB, there may be a failure of transmission because of resource confliction. Thus candidate RB pattern shown in FIG. 7, 8 or 9 are other alternatives.

In an embodiment, UE 104 may perform LBT on at least one channel within the second window. For example, UE 104 can perform LBT for channels 0 and 1 simultaneously or sequentially before and during time slot 3 of DMTC 1 in the second window as shown in FIG. 8. As an example, if UE 104 has a plurality of receiving (RX) and transmitting (TX) chains available for LBT, then UE 104 may perform LBT simultaneously. If UE 104 has only one receiving (RX) and transmitting (TX) chain available for LBT, then UE 104 may perform LBT sequentially.

In another embodiment, a part of resource blocks in the second window can be used as candidate resource blocks for physical random access signal transmission. In this case, the second window may comprise a second pattern of candidate resource block. The second pattern of candidate resource block can have any suitable pattern, and the disclosure has no limit on it. For example, each channel in the second window may have at least one candidate resource block. Each channel in the second window may have the same number of candidate resource blocks. A channel in the second window may not have a candidate resource block. A channel may have a larger number of candidate resource blocks than another channel.

Figure 9:
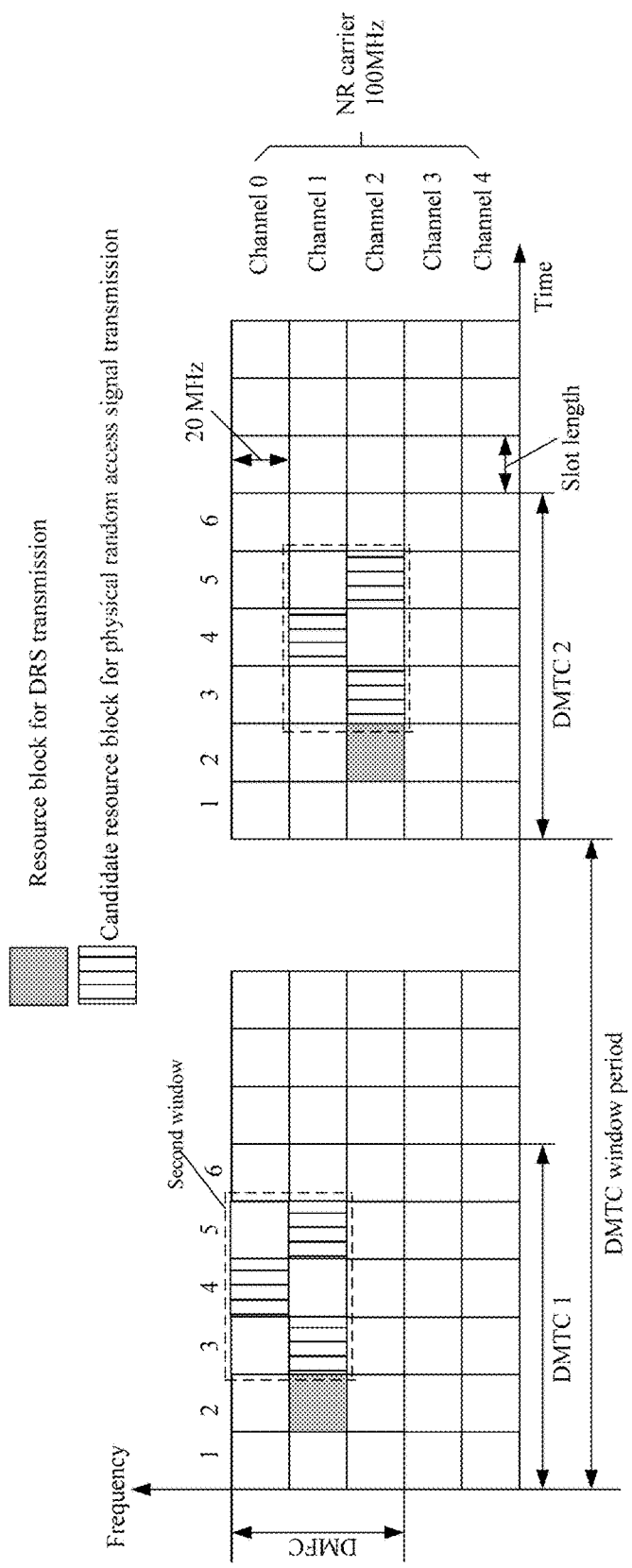
FIG. 9 is a diagram depicting a second window comprising a second pattern of candidate resource block according to an embodiment of the present disclosure.

FIG. 9 is a diagram depicting a second window comprising a second pattern of candidate resource block according to an embodiment of the present disclosure. FIG. 9 is similar to FIG. 8 except that second window comprises a second pattern of candidate resource block in which the candidate resource blocks are just a part of all resource blocks comprised by the second window. One can understand that a second pattern could also comprise all resource blocks in the second window as candidate resource blocks as shown in FIG. 8. As shown in FIG. 9, the resource blocks filled with vertical lines are candidate resource blocks for transmission of physical random access signal.

In this embodiment, UE 104 can perform LBT based on the second pattern. For example, UE 104 can perform LBT for channel 1 before time slot 3 of DMTC 1 of FIG. 9 since only one resource block located at a position (slot 3, channel 1) is the candidate resource block. If this resource block is not available, then UE 104 can perform LBT for channel 0 before slot 4. The LBT will be performed based on the second pattern until at least one available resource block is found.

Similar to the first pattern, the second pattern of candidate resource block may be represented by any suitable parameters. For example, the second pattern of candidate resource block may be represented by at least one of time offset, time continuous number, repetition parameter, frequency offset, and resource position.

In an embodiment, the second window comprises at least two channels and at least one of the at least two channel has a second priority level. The second priority level may be determined based on any suitable criteria. For example, the criteria may comprise channel usage rate, channel index, channel position, channel usage history information, etc. Once a second window is determined, priority level of the channels within the second window is determined. As an example, channel or resource block adjacent to channel or resource block for DRS transmission has a higher second priority level. In a further embodiment, a channel with higher second priority level may have a larger number of candidate resource blocks for physical random access signal transmission.

In this embodiment, UE 104 may perform LIST based on the determined second priority level the channels. As an example, supposing that there are three channels for LBT in the second window and the first priority level of channel 1 is higher than that of channel 0 which is higher than channel 2 and only one receiving (RX) and transmitting (TX) chain is available for LBT, UE 104 may first switch RX chain to channel 0 to perform LBT for channel 0. Then the network element 110 may switch RX chain to channel 1 immediately after LBT failed on channel 0. This procedure is repeated until LBT is successful.

After LBT, UE 104 may select an available channel based on the result of LBT. For example, the first available channel or its resource block may be selected for physical random access signal transmission. If there are two or more available channels, the network element 110 may select an available channel randomly or based on any other suitable rules such as the second priority level.

Then UE 104 may transmit the physical random access signal on the selected available channel or its resource block to the network element 110.

The network element 110 may detect the physical random access signal based on the second window, wherein the second window is determined based at least partly on the at least one resource block for transmission of the discovery reference signal as mentioned above. UE 104 and the network element 110 may follow the same way to determine the second window. The second window have been described with reference to FIGS. 7-9, therefore detailed description about it is omitted here for brevity.

In an embodiment, the second window comprises at least a channel for transmission of the discovery reference signal. The network element 110 may detect the physical random access signal on this channel.

In an embodiment, the second window comprises only one resource block next to the at least one resource block for DRS transmission in time domain and on the channel for DRS transmission. The network element 110 may detect the physical random access signal on this resource block.

In an embodiment, the second window comprises a second pattern of candidate resource block, and the network element 110 may detect the physical random access signal based on the second pattern. The procedure of the network element 110 detecting the physical random access signal based on the second pattern may be similar to the procedure of UE 104 detecting DRS based on the first pattern.

In an embodiment, the second window comprises at least two channels and at least one of the at least two channels has a second priority level, and the network element 110 may detect the physical random access signal based on the second priority level. The procedure of the network element 110 detecting the physical random access signal based on the second priority level may be similar to the procedure of UE 104 detecting DRS based on the first priority level.

In an embodiment, the network element 110 may detect the physical random access signal in time slot X within the second window, wherein X is a positive integer greater than 1; and transmit data or control information for the rest time slots after time slot X within the second window when the rest time slots are available. The control information is for example an random access response (RAR). This is because that the probability for a UE 104 to initiate random access using the end slots is much lower than the start slots in a second window.

The above embodiments have the following advantages compared to existing solutions:

Reduction of random access delay

Network element power saving for physical random access signal monitoring

Reduction of radio resource consumption for a procedure of physical random access signal transmission In an embodiment, the network element 110 may transmit information regarding at least one of the first window, the second window, a neighbor cell's first window and a neighbor cell's second window. For example, the network element 110 may transmit this information through system information broadcast, DRS, licensed carrier, etc. Accordingly, UE 104 may receive the information regarding at least one of the first window, the second window, a neighbor cell's first window and a neighbor cell's second window.

According to various embodiments, the channel is an unlicensed spectrum channel. In other embodiments, the channel may be a licensed spectrum channel.

Figure 10:
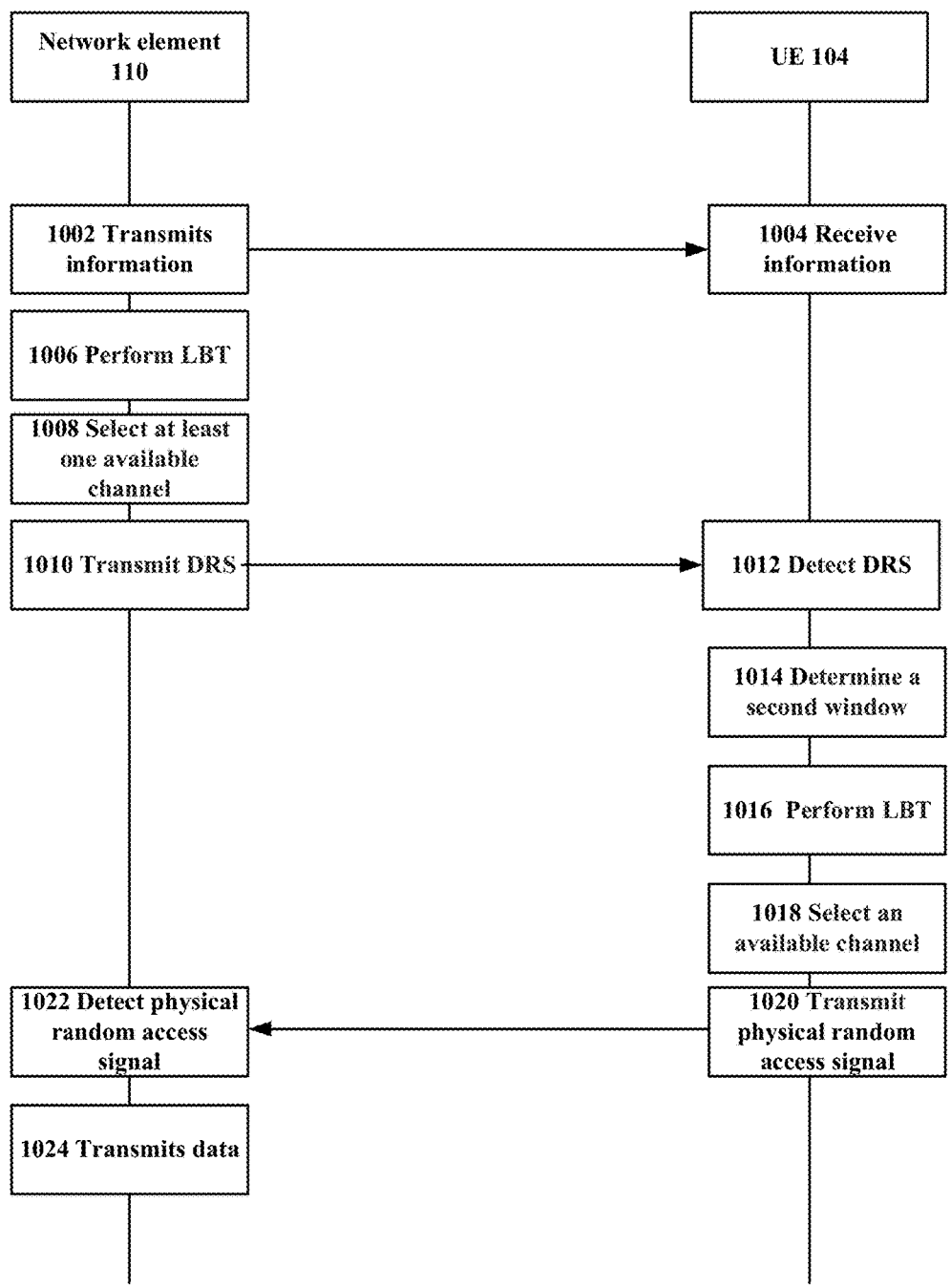
FIG. 10 is a flowchart illustrating a method for transmission according to an embodiment of the disclosure.

FIG. 10 is a flowchart illustrating methods for transmission on both a network element's side and a UE side according to an embodiment of the disclosure. For some parts which have been described in the above embodiments, detailed description thereof is omitted here for brevity.

At step 1002, the network element 110 transmits information regarding at least one of the first window, the second window, a neighbor cell's first window and a neighbor cell's second window to UE 104.

At step 1004, UE 104 receives information regarding at least one of the first window, the second window, a neighbor cell's first window and a neighbor cell's second window.

At step 1006, the network element 110 performs LBT on at least one channel within a first window comprising two or more channels.

In an embodiment, the first window comprises a first pattern of candidate resource block of the two or more channels, the network element 110 performs LBT based on the first pattern at step 1006.

In an embodiment, the discovery reference signal is transmitted in at least two different directions and the first pattern comprises a cascading frequency hopping pattern. The network element 110 performs LBT based on the cascading frequency hopping pattern at step 1006.

In an embodiment, the first pattern or the cascading frequency hopping pattern is represented by at least one of time offset, time continuous number, repetition parameter, frequency offset, and resource position.

In an embodiment, at least one of the two or more channels has a first priority level, the network element 110 performs LBT based on the first priority level at step 1006.

In an embodiment, the first priority level is determined based on at least one of a central channel of the first window being of a higher priority level; a channel used for last transmission of the discovery reference signal being of a higher priority level; and channel index.

At step 1008, the network element 110 selects at least one available channel based on a result of the listen-before-talk.

In an embodiment, at least one of the two or more channels has a first priority level, and the network element 110 selects at least one resource block based on the result of the listen-before-talk and the first priority level at step 1008.

At step 1010, the network element 110 transmits DRS on at least one resource block of the at least one available channel. Information regarding the second window can be involved in the DRS in an embodiment.

At step 1012, UE 104 detects DRS. In an embodiment, UE 104 detects a DRS in its legacy procedure, depending on how the network node such as a gNB determine and send the DRS at step 1012. In this case, the network element 110 may not transmit information regarding the first window to UE 104. In another embodiment, UE 104 detects DRS based on the first window comprising two or more channels at step 1012.

In an embodiment, the first window comprises a first pattern of candidate resource block of the two or more channels and LTE 104 detects DRS based on the first pattern at step 1012.

In an embodiment, at least one of the two or more channels has a first priority level, and UE 104 detect DRS based on the first priority level at step 1012.

At step 1014, UE 104 determines a second window based at least partly on a resource block for reception of the discovery reference signal.

In an embodiment, the second window comprises only one resource block next to a resource block for reception of the discovery reference signal in time domain and the channel for reception of the discovery reference signal, UE 104 transmits a physical random access signal on the resource block within the second window at step 1020. In this embodiment, UE 104 does not perform listen-before-talk on that resource block.

In an embodiment, the second window comprises at least a channel for reception of the discovery reference signal.

At step 1016, UE 104 performs listen-before-talk on at least one channel within the second window.

In an embodiment, the second window comprises a second pattern of candidate resource block, and UE 104 performs the listen-before-talk based on the second pattern at step 1016.

In an embodiment, the second window comprises at least two channels and at least one of the at least two channel has a second priority level, and UE 104 performs the listen-before-talk based on the second priority level at step 1016.

At step 1018, UE 104 selects an available channel based on a result of LBT.

In an embodiment, the second window comprises at least two channels and at least one of the at least two channel has a second priority level, UE 104 selects an available channel based on the result of the listen-before-talk and the second priority level at step 1018.

At step 1020, UE 104 transmits a physical random access signal on the selected available channel.

At step 1022, the network element 110 detects a physical random access signal based on a second window, wherein the second window is determined based at least partly on the at least one resource block for transmission of the discovery reference signal.

In an embodiment, the second window comprises at least a channel for transmission of the discovery reference signal, and the network element 110 detects a physical random access signal on this channel at step 1022.

In an embodiment, the second window comprises only one resource block next to the at least one resource block for transmission of the discovery reference signal in time domain and on the channel for transmission of the discovery reference signal, and the network element 110 detects a physical random access signal on this resource block at step 1022.

In an embodiment, the second window comprises a second pattern of candidate resource block, and the network element 110 detects a physical random access signal based on the second pattern at step 1022.

In an embodiment, the second window comprises at least two channels and at least one of the at least two channels has a second priority level, and the network element 110 detects a physical random access signal based on the second priority level at step 1022.

In an embodiment, the network element 110 detects the physical random access signal in the first X time slots within the second window at step 1022, wherein X is a positive integer greater than 1.

At step 1024, the network element 110 transmits data for the rest time slots within the second window when the rest time slots are available According to various embodiments, the channel is an unlicensed spectrum channel.

Figure 11:
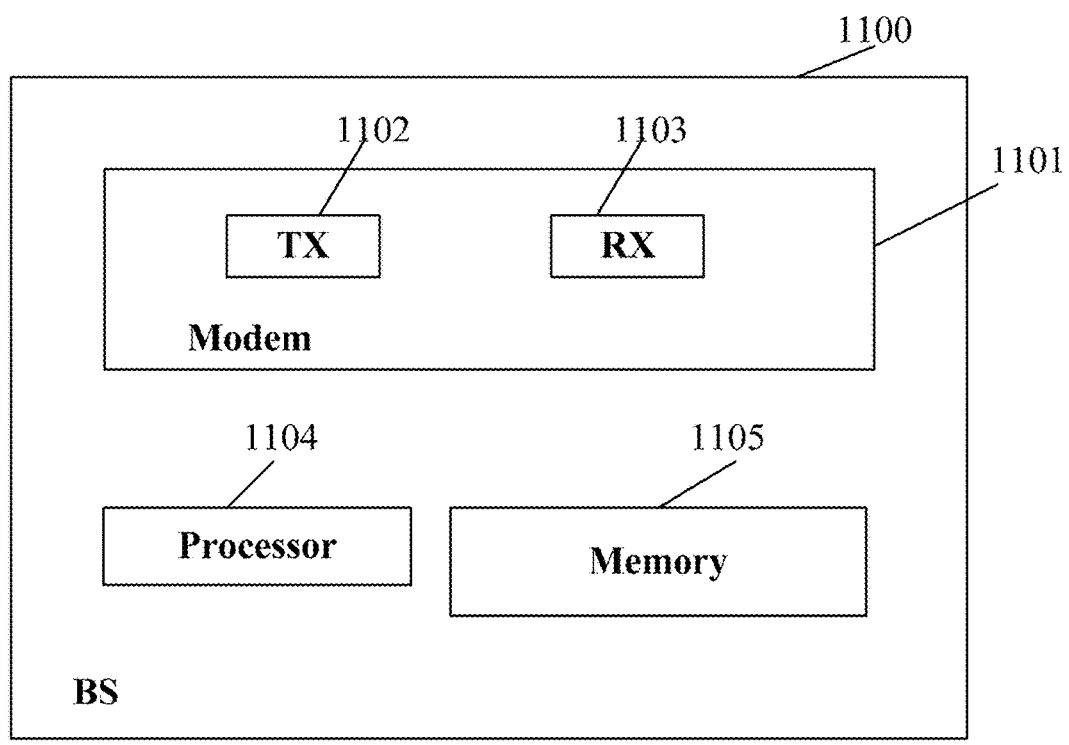
FIG. 11 is a block diagram illustrating a base station according to an embodiment of the disclosure.

FIG. 11 depicts a base station (BS) 1100 capable of implementing the method in a network element for transmission as described above. As shown in FIG. 11, the base station (BS) 1100 comprises a processing device 1104, a memory 1105, and a radio modem subsystem 1101 in operative communication with the processor 1104. The radio modem subsystem 1101 comprises at least one transmitter 1102 and at least one receiver 1103. While only one processor is illustrated in FIG. 11, the processing device 1104 may comprises a plurality of processors or multi-core processor(s). Additionally, the processing device 1104 may also comprise cache to facilitate processing operations.

Computer-executable instructions can be loaded in the memory 1105 and, when executed by the processing device 1104, cause the base station (BS) 1100 to implement the above-described methods for transmission. In particular, the computer-executable instructions can cause the base station (BS) 1100 to perform listen-before-talk on at least one channel within a first window comprising two or more channels; select at least one available channel based on a result of the listen-before-talk; and transmit a discovery reference signal on at least one resource block of the at least one available channel.

In an embodiment, the first window comprises a first pattern of candidate resource block of the two or more channels, the computer-executable instructions can cause the base station (BS) 1100 to perform the listen-before-talk based on the first pattern.

In an embodiment, the discovery reference signal is transmitted in at least two different directions and the first pattern comprises a cascading frequency hopping pattern.

In an embodiment, the first pattern or the cascading frequency hopping pattern is represented by at least one of time offset, time continuous number, repetition parameter, frequency offset, and resource position.

In an embodiment, at least one of the two or more channels has a first priority level and the computer-executable instructions can cause the base station (BS) 1100 to perform the listen-before-talk based on the first priority level; and/or select at least one resource block based on the result of the listen-before-talk and the first priority level.

In an embodiment, the first priority level is determined based on at least one of a central channel of the first window being of a higher priority level; a channel used for last transmission of the discovery reference signal being of a higher priority level; and channel index.

In an embodiment, the computer-executable instructions can cause the base station (BS) 1100 to detect a physical random access signal based on a second window for physical random access signal detection, wherein the second window is determined based at least partly on the at least one resource block for transmission of the discovery reference signal.

In an embodiment, the second window comprises at least a channel for transmission of the discovery reference signal.

In an embodiment, the second window comprises only one resource block next to the at least one resource block for transmission of the discovery reference signal in time domain.

In an embodiment, the second window comprises a second pattern of candidate resource block, and the computer-executable instructions can cause the base station (BS) 1100 to detect the physical random access signal based on the second pattern.

In an embodiment, the second window comprises at least two channels and at least one of the at least two channels has a second priority level, and the computer-executable instructions can cause the base station (BS) 1100 to detect the physical random access signal based on the second priority level.

In an embodiment, the computer-executable instructions can cause the base station (BS) 1100 to detect the physical random access signal in the first X time slots within the second window, wherein X is a positive integer greater than 1; and transmit data for the rest time slots within the second window when the rest time slots are available.

In an embodiment, the channel is an unlicensed spectrum channel.

In an embodiment, the computer-executable instructions can cause the base station (BS) 1100 to transmit information regarding at least one of the first window, the second window, a neighbor cell's first window and a neighbor cell's second window.

Figure 12:
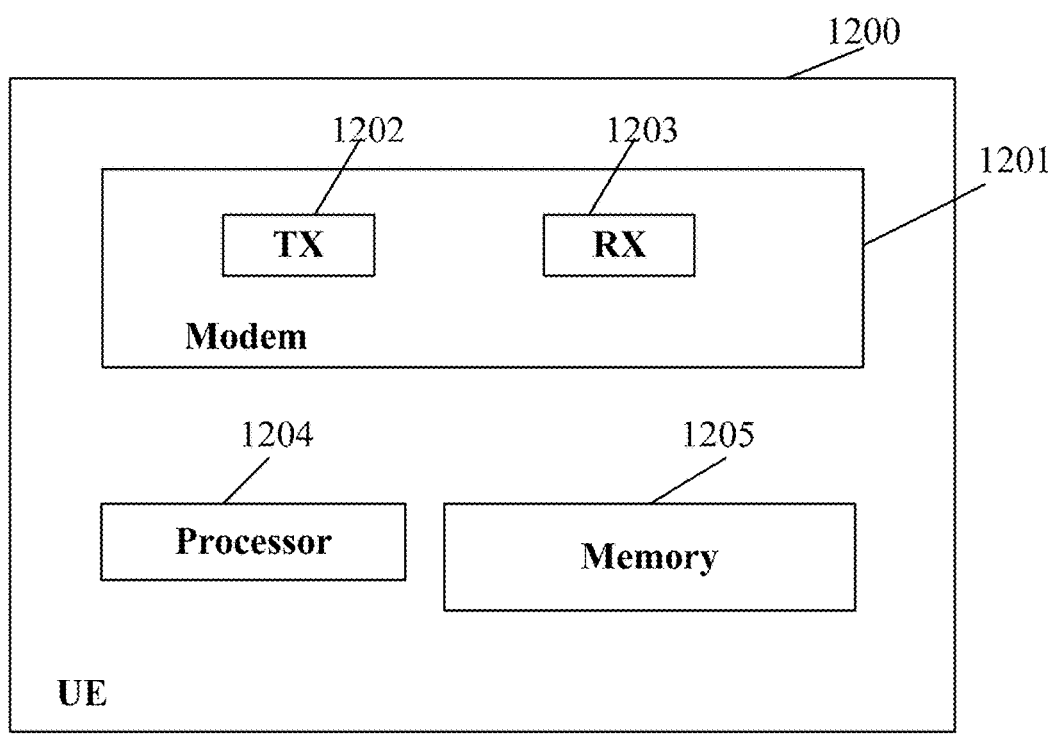
FIG. 12 is a block diagram illustrating a user equipment according to an embodiment of the disclosure.

FIG. 12 depicts a user equipment 1200 capable of implementing the methods for transmission as described above. As shown in FIG. 12, the user equipment 1200 comprises a processing device 1204, a memory 1205, and a radio modem subsystem 1201 in operative communication with the processor 1204. The radio modem subsystem 1201 comprises at least one transmitter 1202 and at least one receiver 1203. While only one processor is illustrated in FIG. 12, the processing device 1204 may comprises a plurality of processors or multi-core processor(s). Additionally, the processing device 1204 may also comprise cache to facilitate processing operations.

Computer-executable instructions can be loaded in the memory 1205 and, when executed by the processing device 1204, cause the user equipment 1200 to implement the above-described methods for transmission. In particular, the computer-executable instructions can cause the user equipment 1200 to detect a discovery reference signal and determine a second window based at least partly on a resource block for reception of the discovery reference signal.

In an embodiment, the computer-executable instructions can cause the user equipment 1200 to detect the discovery reference signal based on a first window comprising two or more channels.

In an embodiment, the first window comprises a first pattern of candidate resource block of the two or more channels, and the computer-executable instructions can cause the user equipment 1200 to detect the discovery reference signal based on the first pattern.

In an embodiment, the first pattern of candidate resource block is represented by at least one of time offset, time continuous number, repetition parameter, frequency offset, and resource position.

In an embodiment, at least one of the two or more channels has a first priority level, and the computer-executable instructions can cause the user equipment 1200 to detect the discovery reference signal based on the first priority level.

In an embodiment, the first priority level is determined based on at least one of a central channel of the first window being of a higher priority level; a channel used for last reception of the discovery reference signal being of a higher priority level; and channel index.

In an embodiment, the computer-executable instructions can cause the user equipment 1200 to determine a second window based at least partly on a resource block for reception of the discovery reference signal.

In an embodiment, the second window comprises at least a channel for reception of the discovery reference signal.

In an embodiment, the second window comprises only one resource block next to a resource block for reception of the discovery reference signal in time domain and on the channel for reception of the discovery reference signal, and the computer-executable instructions can cause the user equipment 1200 to transmit a physical random access signal on the resource block within the second window without performing listen-before-talk on the resource block.

In an embodiment, the computer-executable instructions can cause the user equipment 1200 to perform listen-before-talk on at least one channel within the second window; select an available channel based on a result of the listen-before-talk; and transmit a physical random access signal on the available channel.

In an embodiment, the second window comprises a second pattern of candidate resource block, and the computer-executable instructions can cause the user equipment 1200 to perform the listen-before-talk based on the second pattern.

In an embodiment, the second window comprises at least two channels and at least one of the at least two channel has a second priority level, and the computer-executable instructions can cause the user equipment 1200 to at least one of perform the listen-before-talk based on the second priority level; and select an available channel based on the result of the listen-before-talk and the second priority level.

In an embodiment, the channel is an unlicensed spectrum channel.

In an embodiment, the computer-executable instructions can cause the user equipment 1200 to receive information regarding at least one of the first window, the second window, a neighbor cell's first window and a neighbor cell's second window.

According to an aspect of the disclosure it is provided a computer program product comprising at least one non-transitory computer-readable storage medium having computer-executable program instructions stored therein, the computer-executable instructions being configured to, when being executed, cause a BS to operate as described above.

According to an aspect of the disclosure it is provided a computer program product comprising at least one non-transitory computer-readable storage medium having computer-executable program instructions stored therein, the computer-executable instructions being configured to, when being executed, cause a UE to operate as described above.

It is noted that any of the components of the network element and mobile element can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

The terms "computer program", "software" and "computer program code" are meant to include any sequences or human or machine cognizable steps which perform a function. Such program may be rendered in virtually any programming language or environment including, for example, C/C++, Fortran, COBOL, PASCAL, assembly language, markup languages (e.g., HTML, SGML, XML), and the like, as well as object-oriented environments such as the Common Object Request Broker Architecture (CORBA), Java™ (including J2ME, Java Beans, etc.), Binary Runtime Environment (BREW), and the like.

The terms "memory" and "storage device" are meant to include, but not limited to, an electronic, magnetic, optical, electromagnetic, infrared, or semiconductor system, apparatus, or device, or any suitable combination of the foregoing. More specific examples (a non-exhaustive list) of the memory or storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method for transmission in a User Equipment, comprising:
    detecting a discovery reference signal based on a first window comprising two or more channels, at least one of the two or more channels having a first priority level, the discovery reference signal detected based on the first priority level; and
    determining a second window based at least partly on a resource block for reception of the discovery reference signal.

2. The method according to claim 1, wherein the first window comprises a first pattern of candidate resource block of the two or more channels, and detecting a discovery reference signal comprises:
    detecting the discovery reference signal based on the first pattern.

3. The method according to claim 1, wherein the second window comprises a second pattern of candidate resource block, and performing listen-before-talk comprises:
    performing the listen-before-talk based on the second pattern.

4. The method according to claim 3 wherein the second window comprises at least two channels and at least one of the at least two channel has a second priority level, wherein
    performing listen-before-talk comprises performing the listen-before-talk based on the second priority level; and/or
    selecting an available channel comprises selecting a resource block based on the result of the listen-before-talk and the second priority level.

5. The method according to claim 1, further comprising:
    receiving information regarding at least one of the first window, the second window, a neighbor cell's first window and a neighbor cell's second window.

6. A base station (BS), comprising:
    a processor; and
    a memory, the memory containing instructions executable by the processor, whereby the BS is operative to:
    perform listen-before-talk on at least one channel within a first window comprising two or more channels, wherein at least one of the at least two channels has a first priority level and the listen-before-talk is performed based on the first priority level;
    select at least one available channel based on a result of the listen-before-talk;
    select at least one resource block based on the result of the listen-before-talk and the first priority level; and
    transmit a discovery reference signal on the at least one resource block of the at least one available channel.

7. The base station of claim 6, wherein the first window comprises a first pattern of candidate resource block of the two or more channels, and the base station is operative to:
    perform the listen-before-talk based on the first pattern.

8. The base station of claim 6, wherein the first priority level is determined based on at least one of:
    a central channel of the first window being of a higher priority level;
    a channel used for last transmission of the discovery reference signal being of a higher priority level; and
    channel index.

9. The base station of claim 6, the base station is further operative to:
    detect a physical random access signal based on a second window for physical random access signal detection,
    wherein the second window is determined based at least partly on the at least one resource block for transmission of the discovery reference signal.

10. The base station of claim 9, wherein the second window comprises a second pattern of candidate resource block, and the base station is further operative to:
    detect the physical random access signal based on the second pattern.

11. The base station of claim 9, wherein the second window comprises at least two channels and at least one of the at least two channels has a second priority level, and the base station is further operative to:
    detect the physical random access signal based on the second priority level.

12. A user equipment (UE), comprising:
    a processor; and
    a memory, the memory containing instructions executable by the processor, whereby the UE is operative to:
    detect a discovery reference signal based on a first window comprising two or more channels, at least one of the two or more channels having a first priority level, the discovery reference signal detected based on the first priority level; and
    determine a second window based at least partly on a resource block for reception of the discovery reference signal.

13. The UE of claim 12, wherein the first window comprises a first pattern of candidate resource block of the two or more channels, and the UE is operative to detect the discovery reference signal based on the first pattern.

14. The UE of claim 12, wherein the second window comprises a second pattern of candidate resource block, and the UE is further operative to:

perform listen-before-talk on the second pattern on at least one channel within the second window;

select an available channel based on a result of the listen-before-talk; and transmit a physical random access signal on the available channel.

15. The UE of claim 14, wherein the second window comprises at least two channels and at least one of the at least two channel has a second priority level, and the UE is operative to:

perform the listen-before-talk based on the second priority level; and/or select a resource block based on the result of the listen-before-talk and the second priority level.

* * * * *